United States Patent Office.

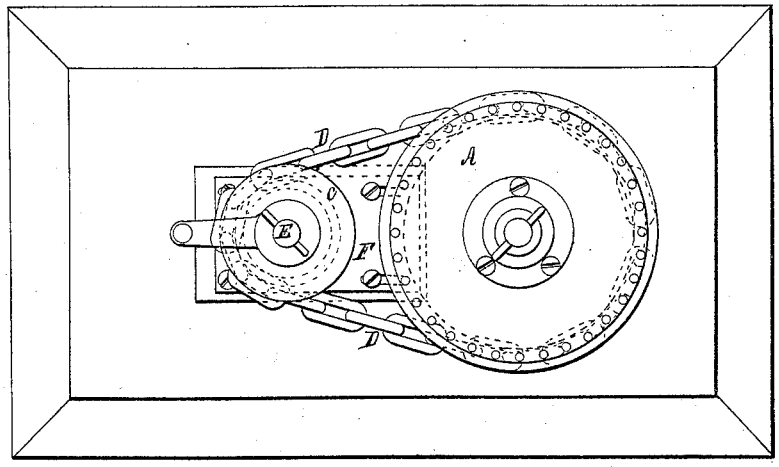
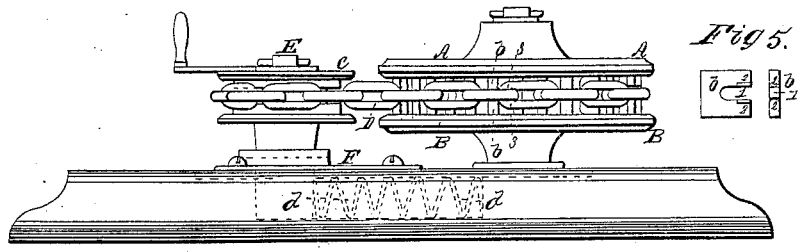
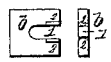
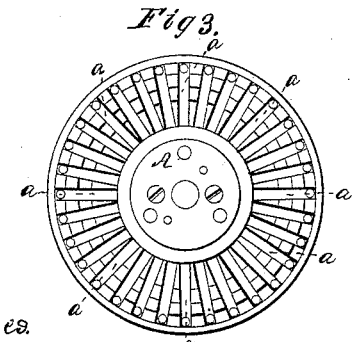
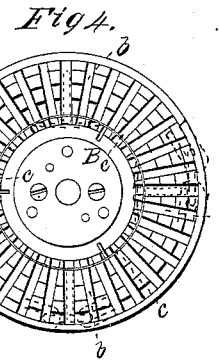

STUART PERRY, OF NEWPORT, NEW YORK.

Letters Patent No. 69,243, dated September 24, 1867.

IMPROVEMENT IN CHAIN-WHEELS FOR CHAIN HORSE-POWER.

*The Schedule referred to in these Letters Patent and making part of the same.*

TO ALL WHOM IT MAY CONCERN:

Be it known that I, STUART PERRY, of Newport, in the county of Herkimer, and State of New York, have invented certain new and useful Improvements in Chain-Wheels, for running a chain with regular or irregular lengths or sizes of links, for horse or other powers; and I do hereby declare the following to be a full, clear, and exact description of the same, reference being had to the accompanying drawings, making a part of this description or specification, in which—

Figure 1 represents a top plan of one of the chain-wheels, with a chain around it and around a pulley driven by it.

Figure 2 represents a side elevation of the same.

Figure 3 represents a view of the under side of the upper plate of the chain-wheel.

Figure 4 represents a view of the upper side of the under plate of the chain-wheel, with a portion of a chain, shown in red lines, in connection with it; and also, in red, the yielding of the cogs, and spring for restraining or returning them after the chain has pressed them towards the centre.

Figure 5 represents a side and front view of one of the cogs which I prefer to use.

Similar letters of reference, where they occur in the separate figures, denote like parts in all of the drawings.

Owing to the varied and varying lengths of the links of an ordinary chain, permanent cogs, or projections or recesses, to take such links cannot be used without much friction or slipping; and when such cogs, teeth, or other holding surfaces are even made adjustable and then fastened, the difference in the texture of the metal in the same chain, or in the cogs, will cause uneven wearing, and this will again cause unequal lengths of links.

My invention consists in so making or uniting the cogs to the chain-wheel as that they may yield when they do not come properly between the links; but when they do come between the links they shall remain out, and keep the chain from slipping; and thus the links of the chain may be of unequal lengths; but some two or more of them will always find a cog or tooth that will take between them and hold; and when they do not, and are pushed back or into the wheel, they at least do not retard the wheel by clinging to the chain.

To enable others skilled in the art to make and use my invention, I will proceed to describe the same with reference to the drawings.

The chain-wheel is cast in two parts, an upper one, A, and an under one, B, and each having a series of radial recesses, $a\,a\,a$, &c., to receive a series of cogs or teeth, $b$, which can move in said recesses, but cannot drop out of the wheel. In the interior of the wheel, and behind the cogs or teeth $b$, there is a ring, spring, or rubber disk, $c$, against which the cogs or teeth come when pressed in towards the centre of the wheel, and which restrains said teeth or cogs, or aids in again projecting them from the interior. The cogs or teeth $b$, as seen in fig. 5, have horizontal grooves or recesses 1 to take the horizontal links of the chain; and the corners above and below the groove, as at 2, are rounded or shaped to take the rounded ends of the vertical links of the chain. When the end of a vertical link, as at 3, fig. 2, comes against one of the cogs or teeth $b$, as there shown, the cog or tooth will remain out, and prevent the chain from slipping on the wheel, compelling the latter to move with the former. When, however, the vertical links come against the ends of the cogs or teeth, instead of against its side, they, of course, cannot hold upon it, and such cog or tooth, instead of remaining in its position, where it can do no good, and might do much injury, is simply pushed into or towards the centre of the wheel, and out of the way, for the time being, but is returned again, so as to be in position, when a link comes around that will take against its side, but to be pushed in as often as the links take it otherwise. The red lines in fig. 4 show the position of the cogs or teeth, and of the ring or spring behind them, when pushed in by the chain links; also shown in red.

The chain, as shown in fig. 1, encircles about two-thirds of the perimeter of the wheel; and if one single link of the chain in all that distance finds a cog or tooth to receive it, as shown at 3, fig. 2, the chain of course cannot slip, and the wheel must move with it. In practice it is found that many of the links of those encircling the wheel are in contact with a cog or tooth that is fairly holding it, and the others that do not receive and hold a link are pushed in out of the way, and offer no friction or resistance when they cannot actually exert a propelling action. In a chain that encircles one-half, or even one-third, of the perimeter of the wheel, it is found that there is no slipping, as there is always one or more cogs or teeth that receive one or more links, and thus avoid any slipping; but if even the chain did slip it could only do so to the extent of the length of one link, for that would bring some link exactly where it was required to take a cog that would hold. It is immaterial, therefore, whether the links of the chain be of uniform lengths or not, for all are not required to take fixed positions in relation to the recesses or projections, cogs or teeth, on the chain-wheel, and one is sufficient to prevent it from slipping; and those that do not so act are out of the way, and the chain cannot cut, wedge, or clog on them.

It is obvious that, where cogs or teeth are permanently fixed upon the chain-wheel, or even where they are adjustable, but held fast after adjustment, a chain, however accurately made at first, would not, for any length of time, take them with any degree of accuracy; and the result is much cutting, wearing, chafing, friction, and loss of power, all of which I avoid by simply allowing the cog or tooth that does not properly receive the end of the link so as to hold it to get out of the way, and not detract from or injure the working parts.

I have described my wheel as horizontal. I do not limit its use to such position. It may be vertical or inclined. I have also represented and described the cogs or teeth as moving radially in slots or recesses, being pushed in by the chain, and returned by a spring. I do not confine myself to such solely, for swing-cogs or teeth can be used on one or on both sides of the chain. When on one side, then the chain on the other side bears on the flange of the wheel. These swing-cogs are so constructed that, whichever of them are in the way of any of the links when passing on to their bed, are pressed in out of the way; and such of them as happen to come between the links remain out and keep the chain from slipping; and such swing-cogs may be moved by gravity, or by springs, or by a cam or cams, or by centrifugal force; and instead of non-yielding bearing surfaces, where the links take against the cogs or teeth, friction-rollers may be used; but the best form and construction is that first above described and shown in the drawings. The cogs or teeth may be hardened by any of the usual processes, or of ast, cast steel or of chilled iron. The chain, too, may be cemented or hardened in the well-known ways.

C represents a wheel or pulley for holding up the chain D. This wheel C is hung upon a spindle, E, that is set in a bed or plate, F, that is forced away from the chain-wheel proper by a coiled or other spring, $d$, to keep the chain taut; and, whilst the wheel is more especially designed for horse-powers, I do not restrict my invention solely to such a use of the wheel, as it may be used with other machines, as, for instance, hoisting machines, or capstans, or any wheel or pulley where it is desirable to use a chain having unequal lengths of links, and to prevent it from slipping.

Having thus fully described my invention, what I claim as new, and desire to secure by Letters Patent, is—

A chain-wheel having sliding or yielding cogs or teeth, so that a chain made up of links of unequal lengths can be run thereon, and some of the links always find a tooth or cog that will receive and hold them, and those not so receiving and holding are moved out of the way, as and for the purpose substantially as described.

STUART PERRY.

Witnesses:
 JOHN G. BARRY,
 GEO. L. BRADFORD.